(12) United States Patent
Shi

(10) Patent No.: US 11,533,890 B2
(45) Date of Patent: Dec. 27, 2022

(54) MULTIFUNCTIONAL RETRACTABLE PULLER FOR PET

(71) Applicant: JINHUA SOLID TOOLS CO., LTD., Jinhua (CN)

(72) Inventor: Fuyou Shi, Jinhua (CN)

(73) Assignee: JINHUA SOLID TOOLS CO., LTD., Jinhua (CN)

( * ) Notice: Subject to any disclaimer, the term of this patent is extended or adjusted under 35 U.S.C. 154(b) by 190 days.

(21) Appl. No.: 17/189,225

(22) Filed: Mar. 1, 2021

(65) Prior Publication Data
US 2022/0232804 A1 Jul. 28, 2022

(30) Foreign Application Priority Data

Jan. 22, 2021 (CN) .......................... 202110087545.0

(51) Int. Cl.
*A01K 27/00* (2006.01)
*B65H 75/44* (2006.01)
*B65H 75/40* (2006.01)

(52) U.S. Cl.
CPC .......... *A01K 27/006* (2013.01); *A01K 27/004* (2013.01); *A01K 27/005* (2013.01); *B65H 75/406* (2013.01); *B65H 75/4418* (2013.01); *B65H 75/4471* (2013.01)

(58) Field of Classification Search
CPC .... A01K 27/003; A01K 27/004; A01K 27/00; A01K 27/008
See application file for complete search history.

(56) References Cited

U.S. PATENT DOCUMENTS

| | | | | |
|---|---|---|---|---|
| 8,418,659 B2* | 4/2013 | Harruna | ............... | A01K 27/004 |
| | | | | 119/796 |
| 8,839,745 B1* | 9/2014 | Johnston | ............... | A01K 27/004 |
| | | | | 119/796 |
| 10,058,074 B1* | 8/2018 | Bussell | ................. | E01H 1/1206 |
| 2011/0120388 A1* | 5/2011 | Shahbaz | ............... | A01K 27/004 |
| | | | | 119/796 |
| 2012/0006284 A1* | 1/2012 | Messner | ............ | B65H 75/4431 |
| | | | | 119/796 |
| 2015/0237832 A1* | 8/2015 | O'Brien | ............... | B65H 75/406 |
| | | | | 119/796 |
| 2019/0110439 A1* | 4/2019 | Vilardi | ................. | A01K 27/006 |

* cited by examiner

*Primary Examiner* — Kristen C Hayes

(57) ABSTRACT

The present disclosure relates to a multifunctional retractable puller for pet, which includes a housing, a reel, a ribbon wound on the reel and a zinc alloy hook buckle, a handle integrated with the housing, a handle metal buckle, and a garbage bag device mounted on the metal buckle. The reel-locking key and the reel-opening key of the present disclosure form a switching group. The LED lamp has a function of warning and entertainment, which is convenient for users to warn others when crossing the road at night. The puller has the functions of charging the battery and being charged by the battery, so users do not need to replace the battery. The puller is equipped with a garbage bag device, from which the garbage bag can be taken out at any time, thus facilitating the users dispose of pet excrement at any time.

8 Claims, 4 Drawing Sheets

MULTIFUNCTIONAL RETRACTABLE PULLER FOR PET

TECHNICAL FIELD

The present invention relates to a puller for pet, in particular to a multifunctional retractable puller for pet.

BACKGROUND

1. At present, the pullers for pet on the market are not provided with metal buckles, which are temporarily used by users to tie pets.
2. There are very few pullers for pets on the existing market with night lighting, warning and entertainment lamps and garbage bags at the same time.
3. Most pullers for pet on the existing market have relative single function.
4. The existing dog leash does not have the function of being charged and cannot charge the mobile phone.

SUMMARY

The technical problem to be solved in the present disclosure is a multifunctional puller for pet which can be charged for night lighting and warning lamps, and can effectively solve many deficiencies in the existing technology.

The present disclosure is realized through the following technical solution. A multifunctional retractable puller for pet comprises a housing, a reel arranged inside the housing, a handle, a key module arranged on the handle for locking the reel, and a garbage bag arranged on the reel and the handle, wherein the key module comprises a key panel, a reel-locking key and an reel-opening key, the reel-opening key is mounted inside the reel-locking key, a spring for resetting the reel-locking key is arranged in the reel-locking key, a buckle groove is defined at the other end of the reel-opening key, the handle facing the buckle groove is provided with two buckle protrusions therein, the buckle groove and the buckling convex part are engaged to lock the resetting of the reel-locking key, a middle portion of the reel-opening key is rotatably hinged with the reel-locking key, a lock catch at one end of the reel-locking key is locked with the reel by pressing down the reel-locking key, and the handle is further provided with a charging module for charging an external device and a lighting module used at night.

As a preferred technical solution, the outer end of the reel-locking key is provided with a groove, the reel-opening key is provided with a clasp at a position opposite to the groove, and the clasp is engaged into the groove to position the reel-opening key relative to the reel-locking key.

As a preferred technical solution, the reel-locking key is provided with a rotating shaft, the reel-opening key is provided with a rotating shaft hole at position corresponding to the rotating shaft, and the rotating shaft is rotatably mounted in the rotating shaft hole.

As a preferred technical solution, a key for switching lamp is further provided on the key panel for switching the working mode of the lighting module.

As a preferred technical solution, the lighting module comprises a lighting lamp 221, a diffuser 222 and a reflector 223 arranged inside the lighting lamp, a 360 degree LED strip is further provided on the housing, the lighting module, the 360 degree LED strip and the lamp at the front end of the handle are all controlled by the key for switching lamp, and are energized by a battery located inside the handle, and a control main board is further provided in the handle facing the key for switching lamp.

As a preferred technical solution, the charging module comprises a charging interface for charging an external device, the charging interface is mounted on the charging board, and the charging interface is sealed by a rubber plug when not in use.

As a preferred technical solution, the garbage bag is mounted on a metal buckle through a plastic fixing frame of the garbage bag, one end of the metal buckle is fixed on the handle, the other end forms a metal buckle, a plastic buckle groove is arranged on the housing, the metal buckle is engaged with the plastic buckle groove, and an anti-locking buckle is arranged at an open end of the plastic buckle groove.

As a preferred technical solution, the housing is provided with an outlet, and the lighting module is provided at one end adjacent to the outlet.

The present disclosure has the following beneficial effects: 1. The sense of science and technology is increased; 2. Garbage bag is easily disassembled and assembled, and can be removed from metal when not in use; 3. The reel-locking key and the reel-opening key in the key group can be firstly mounted together to facilitate assembling of the keys; 4. When walking at night, the user can use the puller for pet as a flashlight for lighting; 5. Lithium battery is provided in the handle of the puller, it can be charged when power is off. 6. The key switch structure of the reel-locking switching lamp is skillfully designed and easily to be assembled.

BRIEF DESCRIPTION OF THE DRAWINGS

In order to clearly describe the embodiment of the present disclosure or the technical solution in the existing technology, the embodiment and the drawings used in the description of the existing technology are briefly described. It is apparent that the attached figures in the following description are merely some embodiments of the present disclosure. For ordinary technicians in this field, they can obtain other drawings without inventive labor according to these drawings.

DESCRIPTION OF THE EMBODIMENTS

All features disclosed in this specification, or procedures in all methods or processes disclosed, may be combined in any way except mutually exclusive features and/or steps.

Unless specified or limited otherwise, any of the characteristics disclosed in this specification (including any appended claims, abstract and drawings), may be replaced by other equivalent or alternative features with similar purposes. That is, unless otherwise specified, each feature is only an example of series of equivalent or similar features.

In the description of the present disclosure, it should be understood that, the relative terms such as "one end", "other end", "outer side", "upper", "inner side", "horizontal", "coaxial", "center", "end", "length", "outer end" and the like indicate an orientation or positional relationship based on the orientation or positional relationship shown in the figures, they are only for the purpose of facilitating the description of the present disclosure and simplifying the description, and are not intended to indicate or imply that the device or element referred to must have a specific orientation, be constructed and operate in a specific orientation, and therefore it cannot be understood as the limit to the present disclosure.

Unless otherwise expressly and specifically defined, furthermore, in the description of the present disclosure, "multiple" means at least two, e.g., two, three, etc.

Terms such as "over", "on", "below", "under" and the like used herein to refer to spatial relative positions are used to describe the relationship of one unit or feature with respect to another unit or feature as shown in the figures for ease of illustration. The term of spatial relative position may be intended to include different orientations in use or operation of the device other than those shown in the figures. For example, if the device in the figure is turned over, the unit described as being "under" or "below" other units or features will be "on" other units or features. Thus, the exemplary term "under" may encompass both above and under orientations. The device may be oriented in other ways (rotated 90 degree or other orientations) and the space-related descriptions used herein are interpreted accordingly.

In the present disclosure, the terms "set", "socket", "connection", "penetrate", "plug" and the like are to be understood in a broad sense, e.g., may be a fixed connection, may also be a detachable connection, or may be integrated, unless otherwise expressly specified and limited. It can be mechanical connection or electrical connection. It can be directly connected, or indirectly connected through an intermediate medium, or it can be the internal connection of the two elements or the interaction of the two elements, unless otherwise clearly defined. For those of ordinary skill in this field, the specific meaning of the above terms in the present disclosure will be understood according to the specific circumstances.

Figure 1:
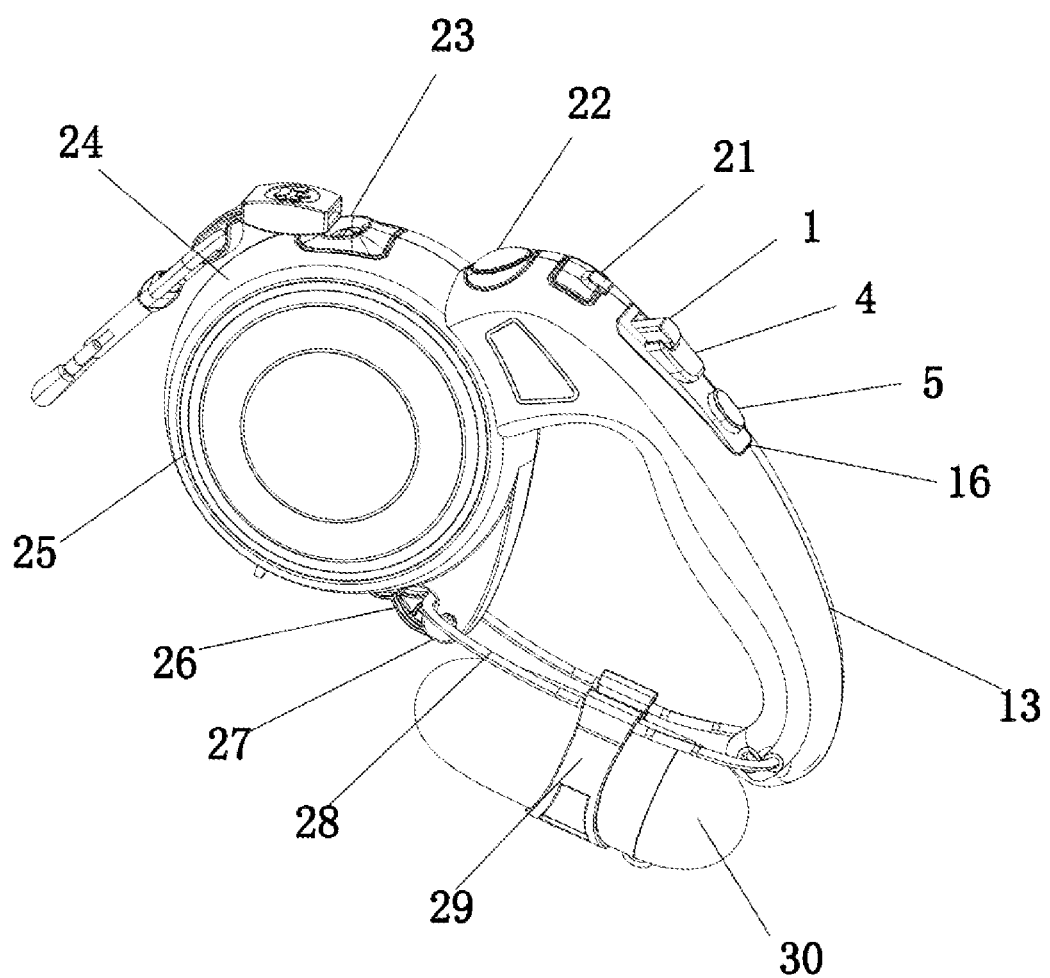
FIG. 1 is a schematic view of the overall structure of the present disclosure.

As shown in FIG. 1, a multifunctional retractable puller for pet according to the present disclosure includes a housing 24, a reel 9 arranged inside the housing 24, a handle 13, a key module arranged on the handle 13 for locking the reel, and a garbage bag device 30 arranged on the metal buckle 28 and the handle 13, wherein a reel cover 91 is arranged at the middle part of the reel.

The key module includes a key panel 16, a reel-locking key 4 and a reel-opening key 1. The reel-opening key 1 is mounted inside the reel-locking key 4. A spring 14 for resetting the reel-locking key 4 is provided inside the reel-locking key 4. A buckle groove 7 is arranged at that other end of the reel-opening key 1. The handle 13 is provided with a buckle protrusion 11 therein facing the buckle groove 7. In this embodiment, two buckle protrusions are provided, respectively on either side of the handle housing. The resetting of the reel-locking key 4 is locked through engaging of the two locking grooves 7 and the two locking protrusions 11. A middle portion of the reel-opening key 1 is rotatably hinged with the reel-locking key 4. The locking catch 12 at one end of the reel-locking key is locked a the bump 9 on the reel by pressing down the reel-locking key 4. The handle 13 is also provided with a charging module for charging an external device and a lighting module 22 for night use.

Figure 2:
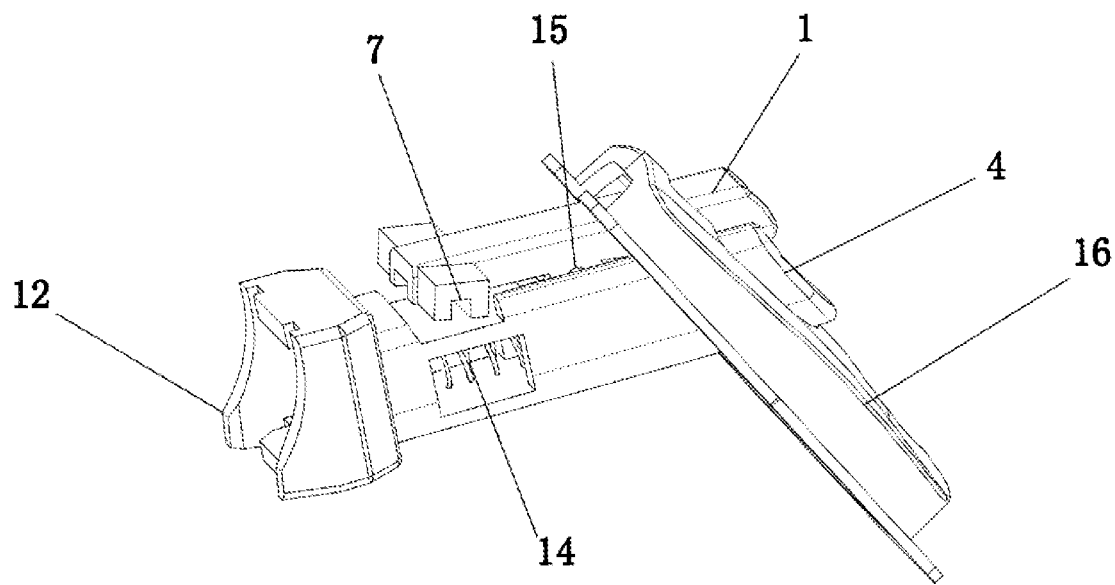
FIG. 2 is a schematic view of a key module of the present disclosure.
Figure 3:
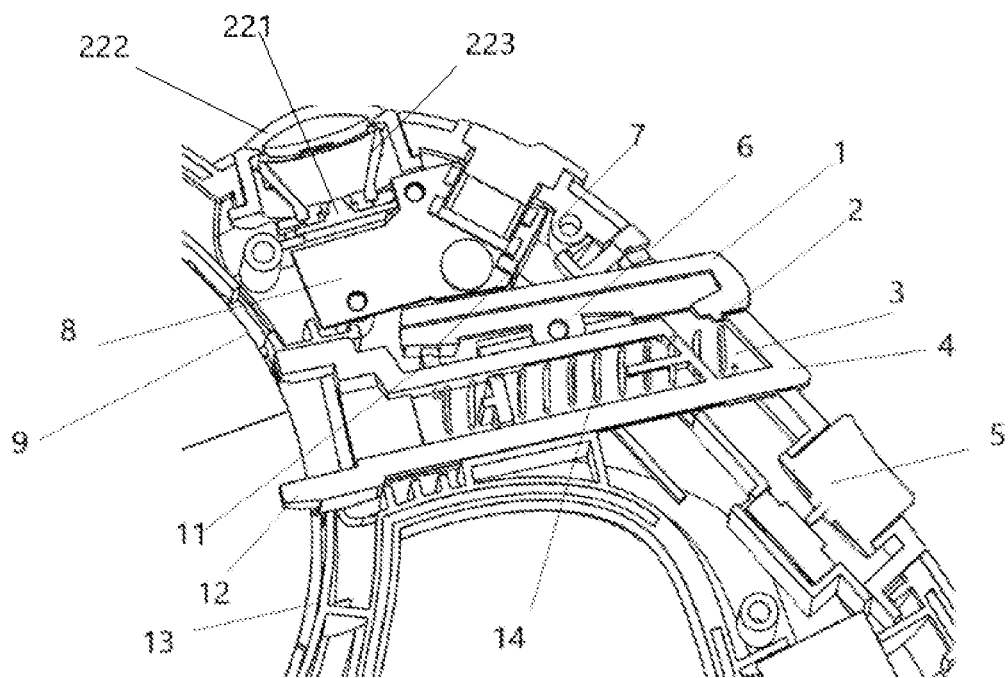
FIG. 3 is a schematic partial cross-sectional view of the present disclosure.

As shown in FIG. 2 and FIG. 3, a groove 3 is defined at the outer end of the reel-locking key 4, and a hook 2 is provided on the reel-opening key 1 at a position facing the groove 3, and the hook 2 is engaged into the groove 3 to position the reel-opening key 1 relative to the reel-locking key 4.

The reel-locking rotating shaft hole 15 is arranged at a position corresponding to the rotating shaft on the reel-opening key 1. A rotating shaft 6 is rotatably mounted in the rotating shaft hole 15. When the reel-opening key is controlled, it is manually driven by a finger to rotate about the rotating shaft. When the reel-locking key is pressed down, the reel is locked by using the reel-locking key then, and then the reel-opening key is pressed, so that the buckle protrusions on the reel-opening key are engaged into the buckle grooves on two sides of the handle, even if the spring of the reel-locking key is pressed at this time, the reel-locking key cannot be rebound by the spring under the action of the reel-opening key, and the reel can be maintained to be locked at this time. When the reel needs to be opened, as long as the reel-opening key is opened, the reel-opening key rotates relative to the reel-locking key, and the buckle protrusions are released from the buckle grooves. At this time, under the action of the spring, the reel-locking key can be jacked up and reset by the spring after removing the fingers, thus the reel can be loosened.

A key for switching lamp 5 is further provided on the key panel 16 for switching the working mode of the lighting module.

Figure 4:
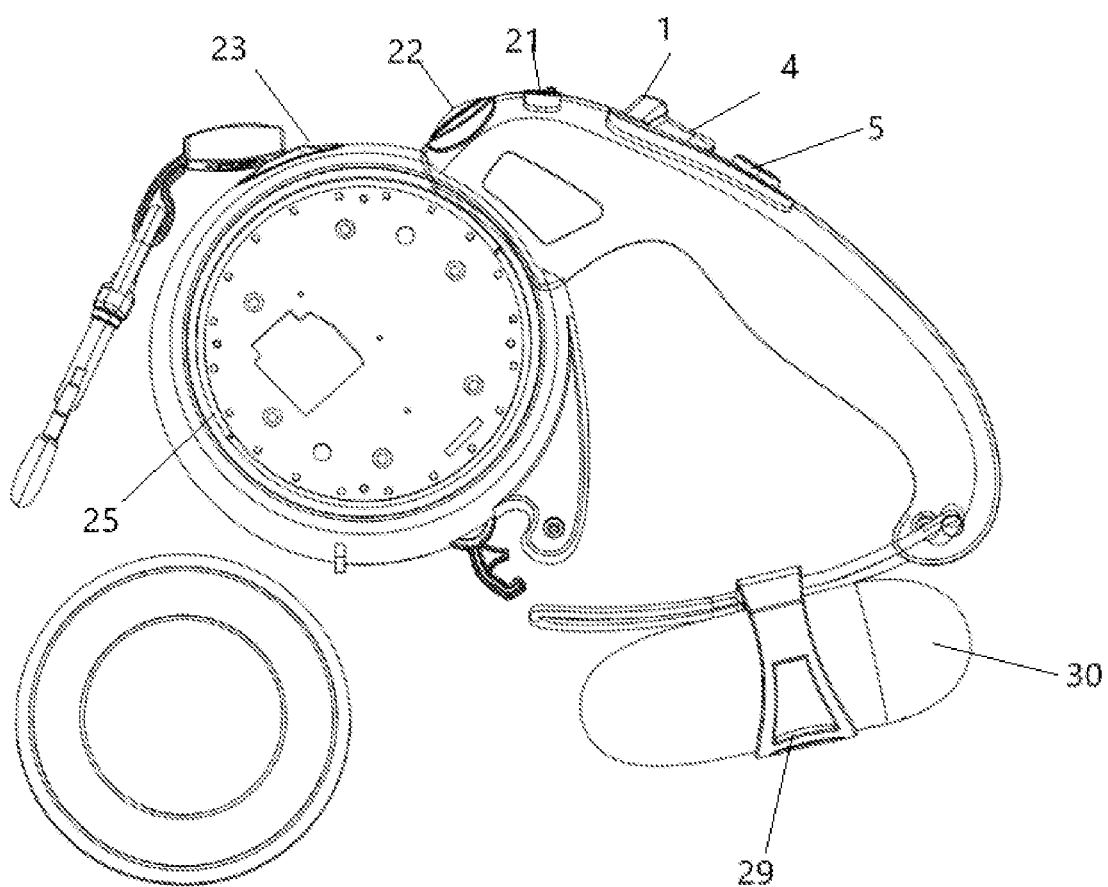
FIG. 4 is a schematic view of the light panel portion in the rear of the driving cover plate of this present disclosure.

In this embodiment, a light module 22 is provided, which includes a light lamp, a diffuser, and a reflector arranged outside the lighting lamp. A 360 degree Ferris wheel advertising lamp 25 is further provided outside the housing, as shown in FIG. 4. The lighting module and the 360 degree Ferris wheel advertising lamp 25 are controlled by the key for switching lamp 5 and are charged by the battery 30 located inside the handle 13. A control main board 8 is further provided in the handle facing the key for switching lamp to realize night lighting through the lighting module. A glittering decoration effect on both sides outside the housing is achieved with 360 degree Ferris wheel advertising lamp, thus increasing the overall entertainment beauty.

The light is bright and laid as follows: the left and right sides of the housing have a bright lighting effect, it also has a 360 degree Ferris wheel light-running effect of various colors, and the middle one is the trademark regular lighting effect. The lighting effects on the left and right sides of the housing can increase the scientific and technological sense of the product. The front end of the handle is provided with a high-brightness lighting bulb, which is more reliable in practicability and can be used as a high-brightness flashlight. It can completely avoid the problem that the road conditions cannot be clearly seen when walking the dog at night.

In an embodiment of the present disclosure, the charging module includes a charging interface for charging an external device, the charging interface is mounted on the control main board, and the charging interface is sealed by a rubber plug when not in use. When charging is needed, just pull out the silicone plug and use the charging interface to charge the external device, thus achieving the purpose of mobile charging. It is not required to carry the power bank. After charging, the battery inside the handle can be charged by a charging device.

In this embodiment the garbage bag device 30 is mounted on a metal buckle 28 One end of the metal buckle 28 is fixed on the handle 13, the other end is engaged into a buckle groove 27 defined on the housing. One end of the metal buckle 28 is buckled in the buckle groove 27. An antilocking buckle 26 is arranged at the open end of the buckle groove.

In addition, the present disclosure adopts the metal buckle 28, which is engaged with a buckle groove 27. The combination of metal buckle and plastic is more practical and novel. Regarding the lighting parts, one is an electroplated reflective part and the other is a light transmitting part, which are connected by snap-fit. The lighting on the market is only a light transmitting part. The lamp shade group formed by electroplated reflective and light transmitting in this design can achieve light gathering and is more practical and innovative.

A pull rope outlet 23 is arranged at the housing, and the light module 22 is arranged at one end close to the pull rope outlet 23.

Figure 5:
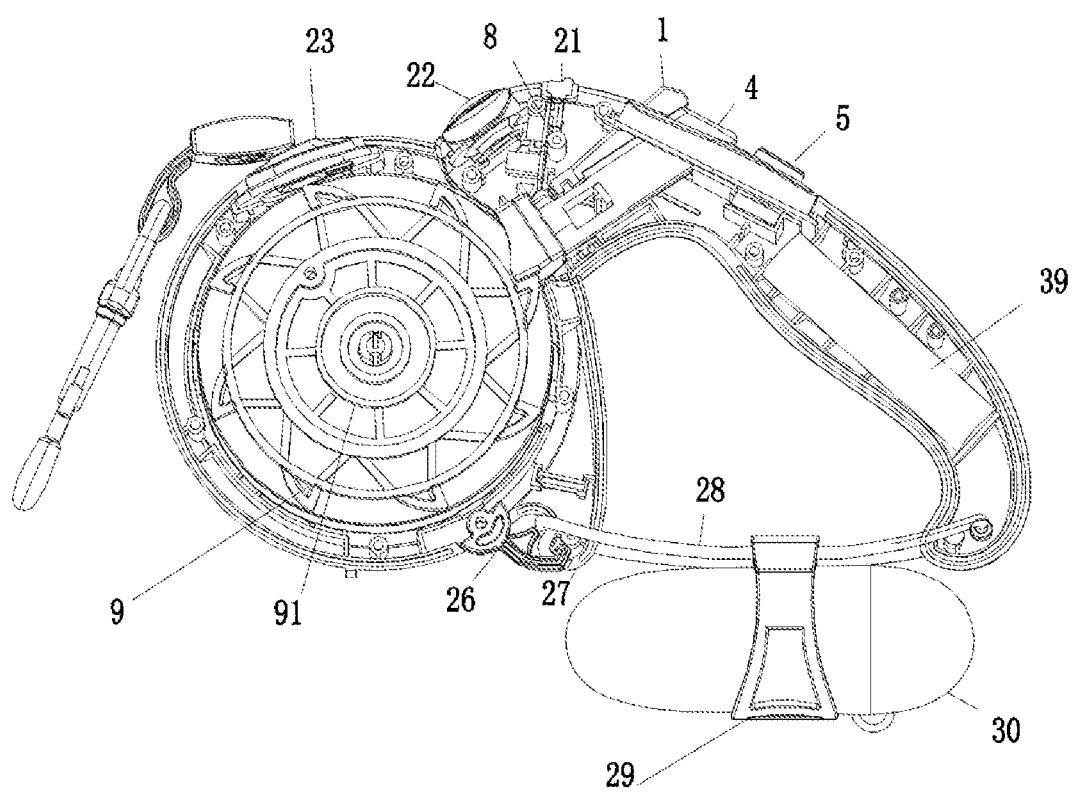
FIG. 5 is a schematic view showing an internal of the present disclosure.

As shown in FIG. 5, the clamping groove of the reel-opening key will leave from the clamping point on the housing by pushing the reel-opening key forwards by a thumb of the user, the spring force makes the reel-locking key rebound automatically, and the reel-locking key release the reel to unlock the reel.

The working principle is as follows. The reel-locking key is pressed down in place to jam the reel. As the reel-opening key and the reel-locking key are axially assembled, when the thumb presses the reel-locking key down to jam the reel, the clamping groove on the reel-opening key is engaged with the opposite clamping point of the housing, and the spring makes the rebound force generated by the reel-locking key less than the rebound resistance generated by the clamping point on the reel-opening key, thus locking the reel.

The beneficial effects of this disclosure are as follows. The reel-locking key and the reel-opening key of the disclosure form a switching group. The LED lamp functions as warning and entertainment, which is convenient for users to warn the others when crossing the road at night. The puller device has the functions of charging and discharging, and it is not necessary for the user to replace the battery. The puller is equipped with a garbage bag device, where the garbage bag can be taken at any time, thus facilitating the users to dispose of pet excrement at any time and meeting the requirements of environmental sanitation. The puller has integrated functions that metal buckle of the handle can be opened at will, the user can temporarily fix the pet on a certain fixed pile, and his hands can temporarily do other work, thus greatly increasing the use function of the puller for pet and enabling it to be applied in more occasions conveniently.

The above mentioned is only a specific embodiment of the present disclosure, but the scope of protection of the present disclosure is not limited thereto, and any changes or substitutions without creative work should be covered by the scope of protection of the present disclosure. Therefore, the scope of protection of the present disclosure should be subject to the scope of protection as defined in the claims.

What is claimed is:

1. A multifunctional retractable puller for pet, comprising: a housing, a reel, a handle, a switching group arranged on the handle for locking the reel or opening the reel; a pulling rope outlet mounted on the housing; a metal buckle mounted on the handle and the housing, and a garbage bag device mounted on the metal buckle, wherein the switching group comprises a reel-opening key and a reel-locking key; the reel-opening key is mounted inside the reel-locking key, a spring for resetting the reel-locking key is mounted inside the reel-locking key an other end of the reel-opening key is provided with a buckle groove, the handle facing the buckle groove is provided with two buckle protrusions therein, the buckle groove and the buckle protrusions are engaged to lock the resetting of the reel-locking key, a middle portion of the reel-opening key and the reel-locking key are rotatably hinged by a rotating shaft, and a lock catch at one end of the reel-locking key is locked with a bump on the reel by pressing down the reel-locking key, the handle is further provided with an electric wire socket for charging and discharging and a nighttime lighting module mounted on the handle.

2. The multifunctional retractable puller for pet according to claim 1, wherein an outer side of the reel-locking key is arranged in the groove of the handle, and the reel-opening key is provided with a clasp opposite to the groove of the handle, and the clasp is engaged into the groove of the handle to position the reel-opening key.

3. The multifunctional retractable puller for pet according to claim 1, wherein the rotating shaft is arranged on the reel-locking key, a rotating shaft hole is defined on the reel-opening key at a position corresponding to the rotating shaft, and the rotating shaft is rotatably mounted inside the rotating shaft hole.

4. The multifunctional retractable puller for pet according to claim 1, wherein a key for switching lamp is further provided on a key panel for switching the working mode of the lighting module.

5. The multifunctional retractable puller for pet according to claim 1, wherein the lighting module comprises a lamp, a diffuser and a reflector arranged outside the lamp, a 360 degree Ferris wheel-type advertising lamp is further provided inside a panel of the housing, the lighting module and the 360 degree Ferris wheel-type advertising lamp are controlled by the key for switching lamp, and are energized by a battery located inside the handle, and a control circuit main board is further provided inside a handle of the key for switching lamp.

6. The multifunctional retractable puller for pet according to claim 1, further comprising a charging and discharging module, wherein the charging and discharged module comprises a charging interface used for charging the battery placed inside the handle and charging for an external device during discharging, the charging interface is mounted on the control circuit main board, and the charging interface is sealed by a rubber plug when not in use.

7. The multifunctional retractable puller for pet according to claim 1, wherein the garbage bag device is mounted on the metal buckle through a plastic fixing frame, one end of the metal buckle is fixed on the handle, the other end of the metal buckle is engaged into a buckle groove defined on the housing, and wherein an anti-locking buckle is arranged at an open end of the buckle groove.

8. The multifunctional retractable puller for pet according to claim 1, wherein the housing is provided with a pulling rope outlet, and the lighting module is arranged at one end adjacent to the pulling rope outlet.

\* \* \* \* \*